US006937662B2

(12) United States Patent
Del Corso

(10) Patent No.: US 6,937,662 B2
(45) Date of Patent: Aug. 30, 2005

(54) METHOD AND DECODER FOR PROCESSING A DIGITAL VIDEO SIGNAL

(75) Inventor: Sandra Del Corso, Clamart (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/480,356

(22) PCT Filed: Jun. 13, 2002

(86) PCT No.: PCT/IB02/02235

§ 371 (c)(1),
(2), (4) Date: Dec. 9, 2003

(87) PCT Pub. No.: WO02/104038

PCT Pub. Date: Dec. 27, 2002

(65) Prior Publication Data

US 2004/0190621 A1 Sep. 30, 2004

(30) Foreign Application Priority Data

Jun. 19, 2001 (EP) ............................. 01401620

(51) Int. Cl.$^7$ ................................ H04N 7/12
(52) U.S. Cl. .............................. 375/240.27; 375/240.29
(58) Field of Search ..................... 375/240.27, 240.24, 375/240.25, 240.29; 348/420.1, 425.2, 607, 618, 627; 382/252, 262, 264, 265, 268

(56) References Cited

U.S. PATENT DOCUMENTS

| 5,311,310 | A | * | 5/1994 | Jozawa et al. | 375/240.13 |
|---|---|---|---|---|---|
| 5,446,501 | A | * | 8/1995 | Takemoto et al. | 348/620 |
| 5,512,956 | A | * | 4/1996 | Yan | 348/606 |
| 5,850,294 | A | * | 12/1998 | Apostolopoulos et al. | 358/426.14 |
| 5,920,356 | A | * | 7/1999 | Gupta et al. | 348/606 |
| 6,178,205 | B1 | * | 1/2001 | Cheung et al. | 375/240.29 |
| 6,281,942 | B1 | * | 8/2001 | Wang | 348/607 |
| 6,370,279 | B1 | * | 4/2002 | Paik | 382/268 |
| 2004/0101050 | A1 | * | 5/2004 | Lee et al. | 375/240.13 |

OTHER PUBLICATIONS

Lynch et al, "Post Processing Transform Coded Images Using Edges", IEEE, pp. 2323–2326, 1995.*
Skocir et al, "Spatio–Temporal Post–Filtering of 3–D Coded Video Sequences", pp. 474–477, IEEE, 2000.*
Derviaux et al, "Blocking Artifact Reduction of DCT Coded Image Sequences Using a Visually Adaptive Postprocessing", pp. 5 8, IEEE, 1996.*
"Adaptive Postprocessor to Reduce Temporal Busyness in Low Bit Rate Video", by Francois X. Coudoux et al., Picture Coding Symposium Apr. 23–27, 2001.

* cited by examiner

Primary Examiner—Vu Le

(57) ABSTRACT

A method and a decoder for processing a digital video signal representing a sequence of images includes detecting motion pixels in a current image (I(t)), median filtering a transformed block (Bc) of the current image through a sub-step of spatial median filtering a first set of coefficients (Mcs, Mu, Md) and a sub-step of temporal median filtering a second set of coefficients (Mct, Mp, Mn), computing an inverse transformed block from the filtered block, and replacing pixels in the inverse transformed block by said detected motion pixels.

8 Claims, 7 Drawing Sheets

METHOD AND DECODER FOR PROCESSING A DIGITAL VIDEO SIGNAL

FIELD OF THE INVENTION

The present invention relates to a method of processing a digital video signal, said video signal representing a sequence of images. The invention also relates to a decoder, said decoder implementing said method.

Such a method may be used in, for example, a video communication system.

BACKGROUND OF THE INVENTION

A video communication system such as, for example, a television communication system, typically comprises an encoder, a transmission medium and a decoder. Such a system receives an input video signal, encodes said signal by means of the encoder, transmits the encoded signal via the transmission medium and then decodes or reconstructs the transmitted signal by means of the decoder, resulting in an output video signal. A video signal represents a given number of images, an image being associated with a time slot t.

Before transmitting video signals, a video communication system may include a video compression process. Such a video compression process is sometimes performed at a low bit rate in order to transmit more video signals. It produces significant distortions in an image of a video signal, especially visual artifacts such as blocking effects (tiled effect aspect), ringing (ghost aspect) or mosquito noise (flying swarm of mosquitoes aspect, i.e. a flickering effect). As described in "Adaptive Postprocessor to reduce Temporal Business in Low Bit Rate Video", at the Picture Coding Symposium 23–27 Apr. 2001 written by F. X Coudoux, M. Gazalet and P. Corlay, a solution to reduce the mosquito noise is to separate non-edge blocks from edge-blocks within an image corresponding to said transmitted video signal, said image comprising blocks referred to as DCT blocks, well-known to those skilled in the art. This solution applies a temporal DCT median filtering on the non-edge blocks. Said temporal median filtering comprises the steps of:

computing a temporal gradient between AC coefficients of three DCT blocks of three consecutive images, respectively, in order to look for discontinuity within said images, by way of a threshold, looking for sudden temporal transitions such as fast motion objects, and if there is a local discontinuity and no sudden transitions, applying a temporal median filtering on said blocks.

One problem of this solution is that it only reduces the mosquito noise on non-edge blocks within an image of said transmitted video signal, whereas mosquito noise can also appear on edge-blocks.

OBJECT AND SUMMARY OF THE INVENTION

Accordingly, it is an object of the invention to provide a method and a decoder for processing a digital video signal, said video signal representing a sequence of images, which allows a better reduction of mosquito noise in the whole image corresponding to said video signal.

To this end, the invention provides a method comprising the steps of:

detecting motion pixels in a current image, computing a discrete frequency transform on blocks of said current image for providing transformed blocks, median filtering a current transformed block, said filtering comprising the sub-steps of:

spatial median filtering a first set of coefficients belonging to the current transformed block and to neighboring blocks, and temporal median filtering a second set of coefficients belonging to the current transformed block and to corresponding blocks of previous and subsequent images, computing an inverse discrete frequency transform on the filtered transformed block for providing an inverse transform block, and replacing pixels in said inverse transformed block by said detected motion pixels.

In addition, the invention provides a decoder comprising:

motion detection means adapted to detect motion pixels in a current image, discrete frequency computation means adapted to compute a discrete frequency transform on blocks of said current image for providing transformed blocks, median filter means adapted to filter a transformed block, said filter comprising:

a spatial median sub-filter adapted to filter a first set of coefficients belonging to the current transformed block and to neighboring blocks, and a temporal median sub-filter adapted to filter a second set of coefficients belonging to the current transformed block and to corresponding blocks of previous and subsequent images, inverse frequency computation means adapted to compute an inverse frequency transform on the filtered transformed block and to provide an inverse transformed block, and replacement means adapted to replace pixels in said inverse transformed block by said detected motion pixels.

As we will see in detail hereinafter, such a method allows, on the one hand, an efficient reduction of mosquito noise and, on the other hand, a homogenous image which is referred to as temporal consistency, especially by virtue of combining of a spatial filtering and a temporal filtering. Moreover, no filtering is done on motion pixels of an image corresponding to the video signal, as this would lead to a blurred image.

BRIEF DESCRIPTION OF THE DRAWINGS

Additional objects, features and advantages of the invention will become apparent upon reading the following detailed description with reference to the accompanying drawings in which.

DETAILED DESCRIPTION OF THE INVENTION

In the following description, functions or constructions that are well-known to those skilled in the art are not described in detail because they would obscure the invention in unnecessary detail.

Figure 1:
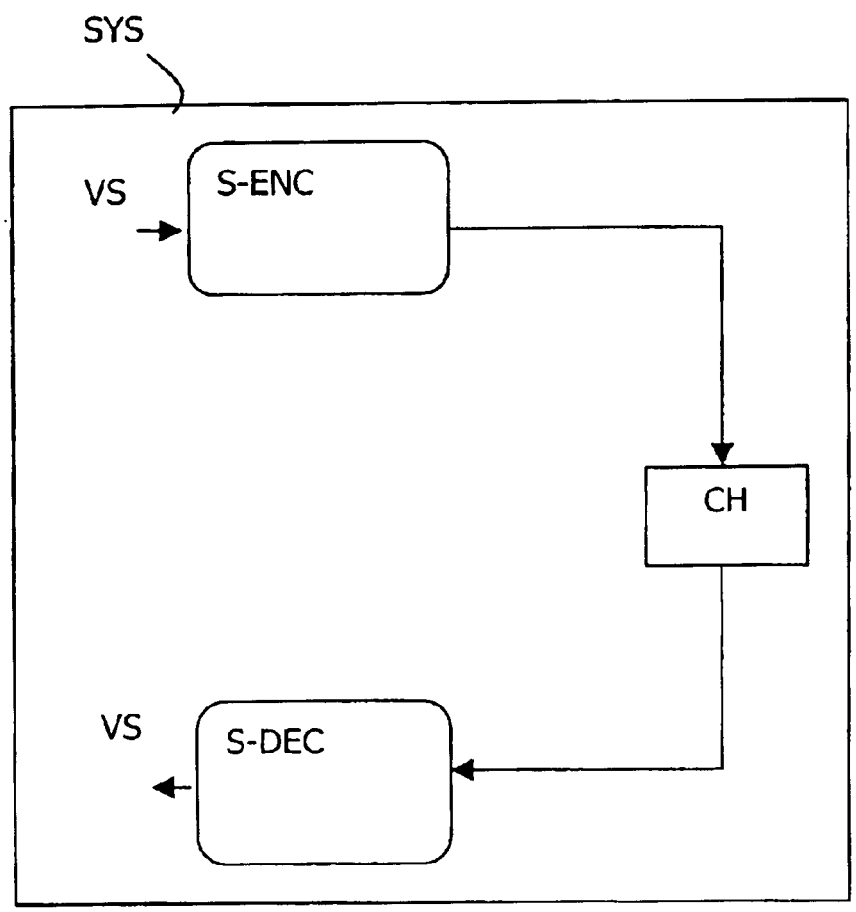
FIG. 1 illustrates a video communication system comprising a decoder according to the invention.

The present invention relates to a method of reducing distortions in a video signal, said video signal representing a sequence of images, an image I(t) being associated with a time slot t. Such a video signal VS is, for example, supplied to a television. Said method is used in particular in a decoder S_DEC as shown in FIG. 1 within a video communication system SYS.

In order to efficiently transmit some video signals through a transmission medium CH, said video communication system SYS comprises a video compression process, which is applied during encoding of a video signal VS through an encoder S_ENC and during decoding via the decoder S_DEC. Owing to the compression system, distortions such as blocking effect, ringing or mosquito noise appear in images of the video signal.

Figure 2:
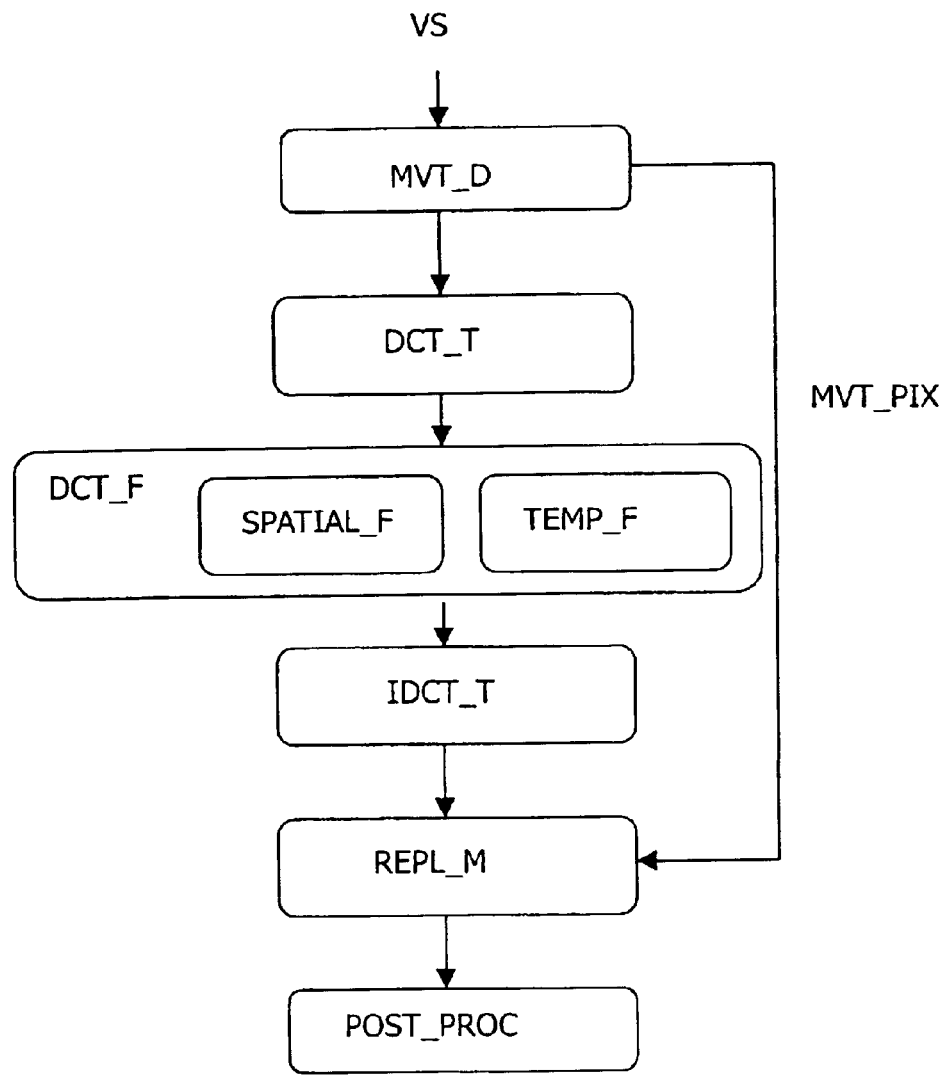
FIG. 2 is a schematic diagram of the method according to the invention, said method being implemented in the decoder of FIG. 1.

In order to reduce these distortions, and in particular mosquito noise, the decoder S_DEC, shown in FIG. 2, comprises:

motion detection means MVT_D adapted to detect motion pixels in a current image I(t), discrete frequency computation means DCT_T adapted to compute a discrete frequency transform on blocks of said current image I(t) for providing transformed blocks, median filter means DCT_F adapted to filter a transformed block Bc, said filter comprising:
   a spatial median sub-filter SPATIAL_F adapted to filter a first set of coefficients Mcs, Mu, Md belonging to the current transformed block Bc and to neighboring blocks Bu, Bd, and
   a temporal median sub-filter TEMP_F adapted to filter a second set of coefficients Mct, Mp, Mn belonging to the current transformed block Bc and to corresponding blocks of previous and subsequent images Bp, Bn, inverse frequency computation means IDCT_T adapted to compute an inverse frequency transform on the filtered transformed block and to provide an inverse transformed block, and replacement means REPL_M adapted to replace pixels in said inverse transformed block by said detected motion pixels.

To this end, the following process is applied to the images of a video signal VS after decoding, and just before displaying the corresponding images on a screen.

Note that an image comprises one field or two fields. In the latter case, each field generally comprises N=207360 pixels in a European television definition full format, which is equal to half of 720 pixels/line*576 lines corresponding to 50 Hz.

Note that an image I(t) at a time slot t will be referred to as the current image.

At a time slot t, a first step 1) of detecting motion pixels in the current image I(t) of the video signal VS is performed. This step allows distinction between motion and non-motion areas of pixels in the image.

Figure 3:
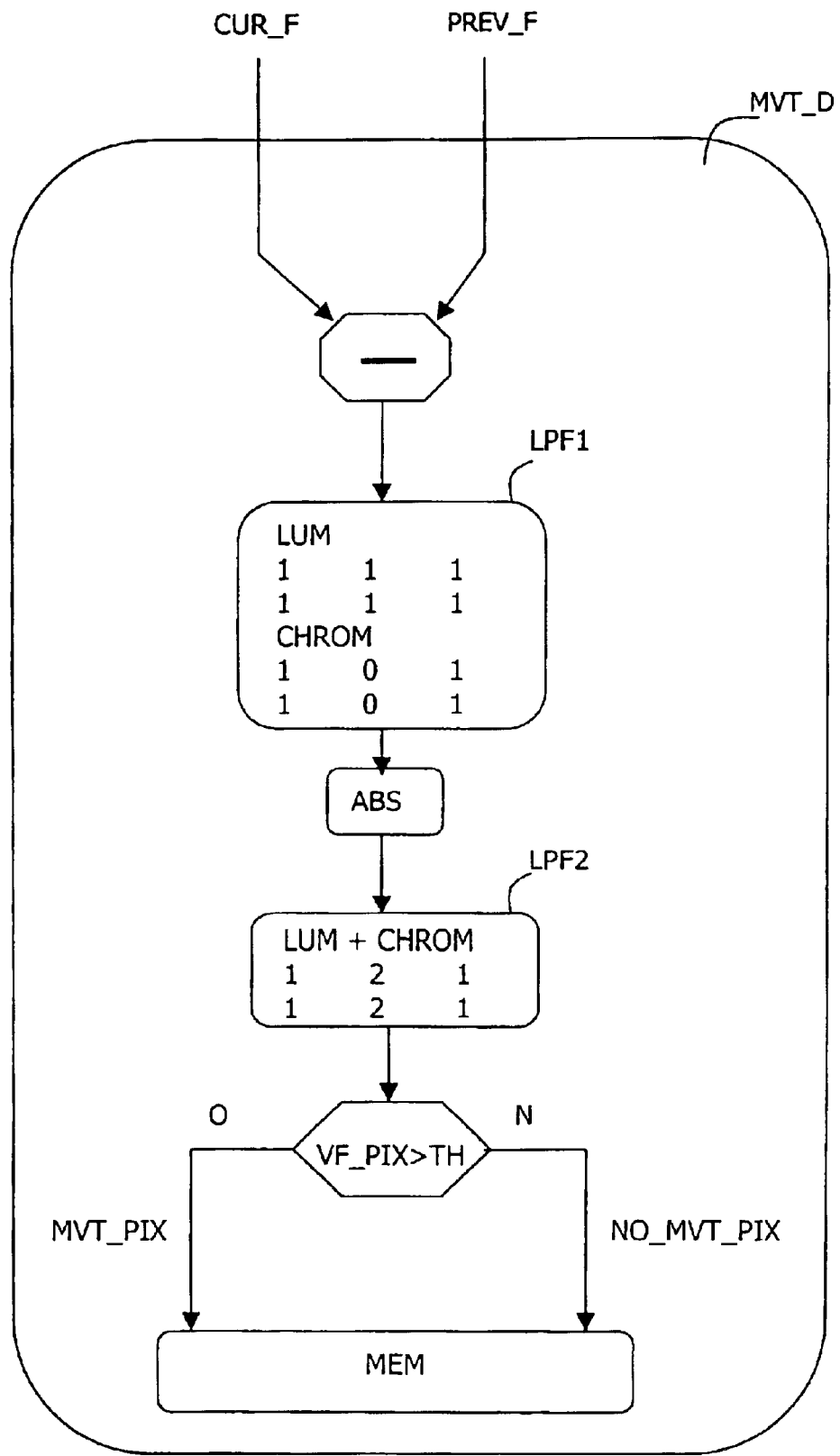
FIG. 3 illustrates a motion detection step of the method according to the invention of FIG. 2.

As shown in FIG. 3, the detection of motion pixels is based on an image difference between two fields. A first image difference is computed between a current field CUR_F(k)(t) and a previous field PREV_F(k)(t−1) belonging to the current image I(t) and to a previous image I(t−1), respectively. The two images are consecutive. In the case of an image comprising two fields, the current and previous fields have the same parity k (i.e. top or bottom). A second image difference is computed between a current field CUR_F(k)(t) and a subsequent field NEXT_F(k)(t+1) belonging to the current image I(t) and to the subsequent image I(t+1), respectively. The two images are consecutive. In the case of an image comprising two fields, the current and subsequent fields have the same parity k.

An image difference gives a motion image, whose pixels are characterized by luminance and chrominance components. A filtering on said pixel components of said image difference is performed. Said filtering is preferably composed of a first average filtering and a second low-pass filtering.

Thus, in a first non-limitative embodiment, a first average filter LPF1 is applied on said motion image. It is preferably applied separately on luminance and chrominance components of the motion image, separately. Said first filter LPF1 is preferably defined as follows for the luminance and chrominance components.

| | Luminance | |
|---|---|---|
| 1 | 1 | 1 |
| 1 | 1 | 1 |
| | Chrominance | |
| 1 | 0 | 1 |
| 1 | 0 | 1 |

Note that the first filter LPF1 can be applied on the luminance component only, but it achieves a lower performance.

This first filter LPF1 has the advantage of achieving a high noise reduction. Indeed, it reduces the noise sensitivity of the motion detection means MVT_D, which could wrongly interpret the noise as motion areas.

As the motion detection means depend on an image difference only, an absolute value ABS of each luminance and chrominance component is computed.

b) Subsequently, a second low-pass filter LPF2 is used in order to suppress switching artifacts (which consist of noise that can't be distinguished from motion with the first filter LPF1 only), between the current and previous or subsequent images. Moreover, it guarantees a smooth fading between these images.

It is preferably applied both at once on the absolute values ABS of the luminance and chrominance components of the motion image. Said second filter is preferably defined as follows for the luminance and chrominance components.

| 1 | 2 | 1 |
|---|---|---|
| 1 | 2 | 1 |

Note that this second filter LPF2 may be more particularly an average filter.

These two filters allow filtered values VF-PIX to be obtained for each luminance and chrominance component of a pixel of the motion image. Motion and non-motion pixels are distinguished or differentiated by way of a threshold TH: when one of the filtered values VF-PIX of a pixel is greater than a threshold TH, the pixel is considered to be a motion pixel MVT_PIX. In the other case, the pixel is considered to be a non-motion pixel NO_MVT_PIX. The threshold TH is preferably set at 200 and may be set at, at least, until 250 as same kind of performances are reached for those values.

The motion MVT_PIX and non-motion NO_MVT_PIX pixels are stored in a memory MEM of the motion detector MVT_D, for further processing.

Note that all the filtering operations mentioned above are preferably performed on the two image differences calculated with the previous PREV_FIELD(k)(t−1) and the subsequent field NEXT_FIELD(k)(t+1). If at least one of the filtered values VF_PX of a pixel in one of the two image differences is greater than the threshold TH, the corresponding pixel is considered to be a motion pixel.

Preferably, the number of motion pixels MVT_PIX within an 8*8 block is count. If this number is greater than a second threshold TH2, this block is a "moving block" and there is no worth performing a median filtering on it. Therefore no discrete frequency transform and no median filtering are done on these "moving blocks". The second threshold TH2 is preferably set at 5.

Note that the motion detector MVT_D also allows detection of sudden temporal transitions in a scene, a scene being a succession of images. In this case, no filtering is performed.

In a preferred second non-limitative embodiment, both low pass filters LPF1 and LPF2 are applied consecutively. Consequently, their coefficients can be combined resulting in only one bi-dimensional filter. With this approach, memory capacity and memory bandwidth is saved. Thereafter, the absolute value ABS of the luminance and chrominance components is calculated. By calculating the absolute value at the end, it gives the advantage of decreasing the complexity of all the calculations.

In a second step 2), a discrete frequency transform on said current image I(t) of the video signal VS is computed for providing transformed blocks. Said discrete frequency transform referred to as DCT allows working in a frequency domain. It is well known to those skilled in the art and therefore will not be explained here.

Usually, a field of an image is split into blocks of, for instance, 8*8 pixels for a MPEG format. A discrete frequency transform is applied on each of these blocks. Said transform provides transformed blocks of 64 coefficients, one referred to as DC coefficient and 63 referred to as AC coefficients, a coefficient AC representing a frequency.

Note that an image is composed of two sub-images: a luminance sub-image and a chrominance sub-image. In a preferred embodiment, the second step and the subsequent steps will be performed on the luminance sub-image, so that, in this embodiment, a coefficient DC represents an average luminance of a block. This embodiment has the advantage of a better performance in terms of filtering.

Note that in other embodiments, the second step and the subsequent steps can be performed on the two sub-images or on the chrominance sub-image only.

In a third step 3), a median filtering is performed on said transformed blocks, as follows.

The filtering step comprises a first sub-step of spatial median filtering and a second sub-step of temporal median filtering. Said filtering is applied to the current field CUR_F(k)(t) in the current image I(t) and to a first transformed block referred to as current block Bc within this current field as follows.

Figure 4A:
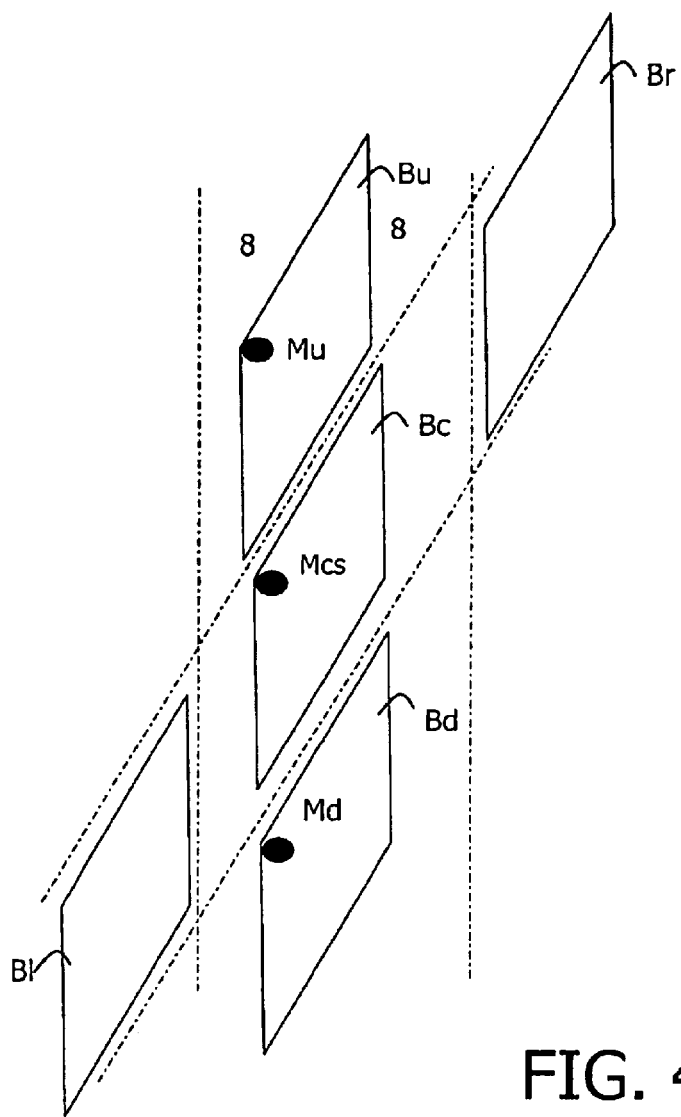
FIG. 4a illustrates a sub-step of spatial median filtering of the method according to the invention of FIG. 2.

As shown in FIG. 4a, a first set of coefficients belonging to the current transformed block Bc and to neighboring blocks Bu, Bd is filtered in the spatial median sub-step 3a). A spatial median M1' is first calculated from said first set of coefficients.

In a preferred embodiment, three coefficients Mcs, Mu, Md are used to compute the spatial median M1', these coefficients belonging to the current transformed block Bc, a block just below Bd and a block just above Bu of the current block Bc, respectively. An efficient trade-off between performance and cost is achieved.

Note that the neighboring blocks may also be a left block Bl and right block Br, but it is less efficient.

Note also that more coefficients and blocks can be used, but the computation cost especially increases upon three coefficients.

Note that all the coefficients in this first set of coefficients have the same position in their respective transformed block.

Subsequently, the current spatial coefficient Mcs belonging to the current block Bc is replaced by the spatial median M1' in the current transformed block Bc. The spatial median filtering has the advantage of giving homogeneous neighboring blocks. Indeed, without this spatial filtering, two neighboring blocks, which represent, for example, a sky within an image, may have two different colors. Hence, the sky would be heterogeneous. Moreover, said spatial filtering allows getting rid of more noise that affects the image.

Figure 4B:
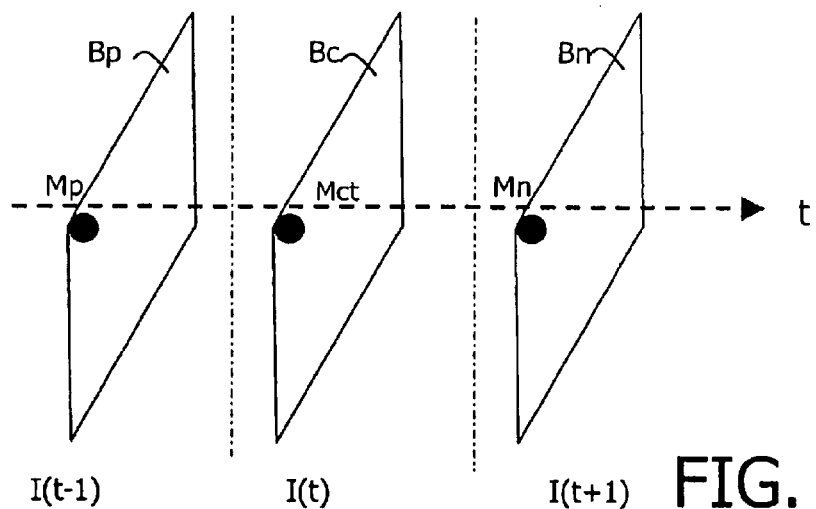
FIG. 4b illustrates a sub-step of temporal median filtering of the method according to the invention of FIG. 2.

As shown in FIG. 4b, a second set of coefficients belonging to the current transformed block Bc and to corresponding blocks Bp, Bn of previous and subsequent images, is filtered in the second temporal sub-step 3b). A temporal median M1" is first calculated from said second set of coefficients.

In a preferred embodiment, three coefficients Mct, Mp, Mn are used to compute the temporal median M1", these coefficients belonging to the current transformed block Bc, to a previous transformed block Bp and to a subsequent transformed block Bn, respectively, these blocks Bp and Bn belong to a just previous I(t−1) and a just subsequent I(t+1) image.

An efficient trade-off between performance and cost is achieved.

Note that all the coefficients have the same position in their respective transformed block. If this were not the case, the image would be blurred.

Subsequently, the current temporal coefficient Mct of the current block Bc is replaced by the temporal median M1" in the current transformed block.

The temporal filtering has the advantage of avoiding a flickering effect between two consecutive blocks within two time slots t. Indeed, without this filtering, two consecutive blocks, which represent, for example, a sky within an image, may have two different colors as well. Hence, the sky would flicker.

In the case of an image I(t) comprising two fields, the first, the previous and the subsequent transformed blocks belong to three fields (the current CUR_F(k)(t), a previous PREV_F(k)(t−1) and the subsequent NEXT_F(k)(t+1)), respectively, which have the same parity k. Hence, pixels at the same position are chosen. For example, the filtering begins with the top parity fields. In the other case, the image would be blurred.

Note that the coefficients M that are used for this median filtering are the DC coefficient and the AC coefficients.

In a first embodiment, the sub-step of temporal median filtering is performed before the sub-step of spatial median filtering, and the current spatial coefficient Mcs of the said spatial sub-step becomes the temporal median M1" calculated in said temporal sub-step. In this first embodiment, we have the following formula:

$$M1'=\text{median}(\text{median}(Mct,Mp,Mn),Mu,Md).$$

Figure 5:
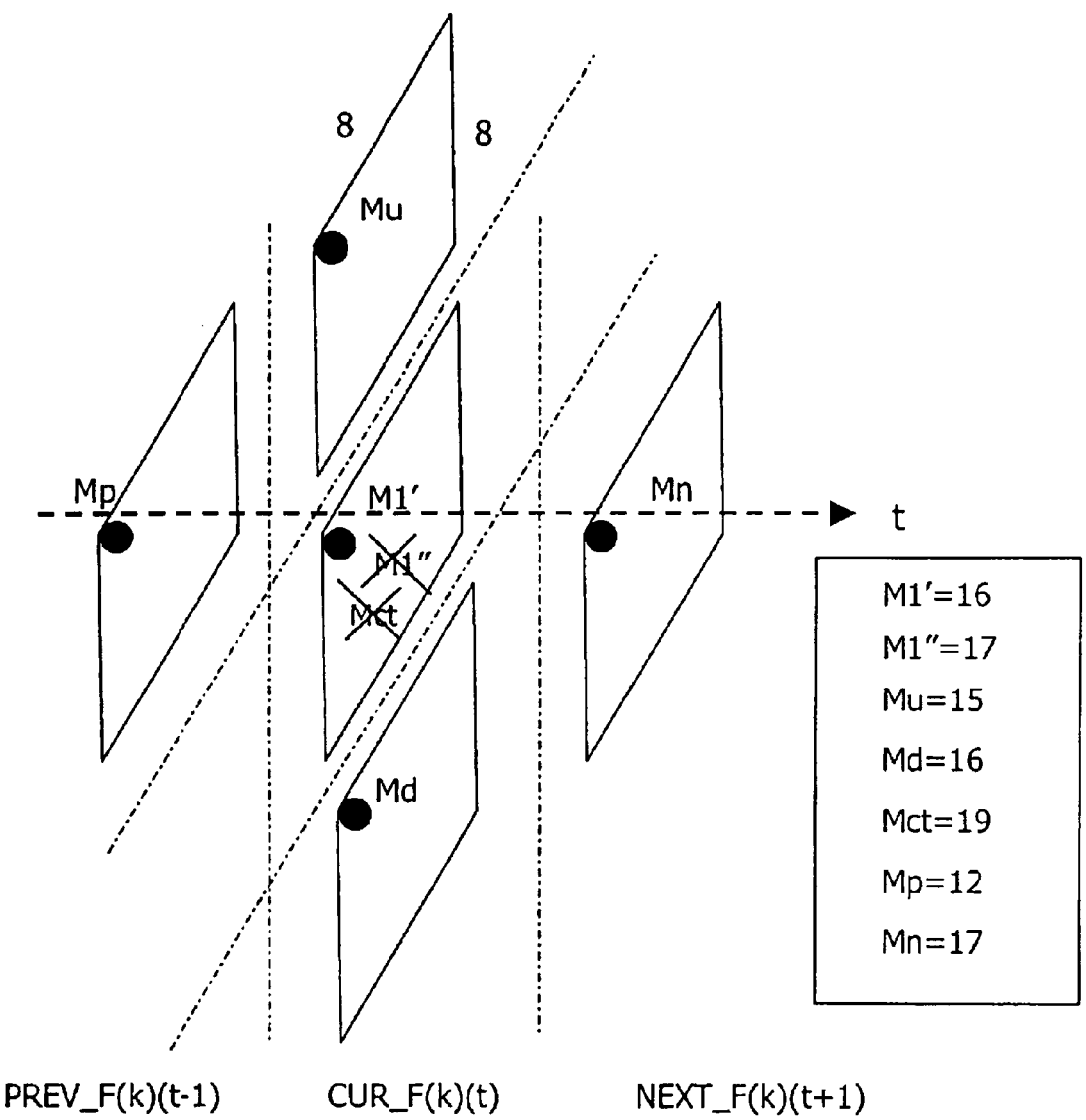
FIG. 5 illustrates a first embodiment of the method according to the invention of FIG. 2.

As shown in FIG. 5, for example, we have Mu=15, Md=16, and Mct=19, Mp=12 and Mn=17. Hence, the temporal median M1" is first calculated. M1"=median(19,12, 17)=17. The current temporal coefficient Mct becomes the temporal median M1". Then, the first median M1' is calculated. M1'=median(17,15,16)=16.

Figure 6:
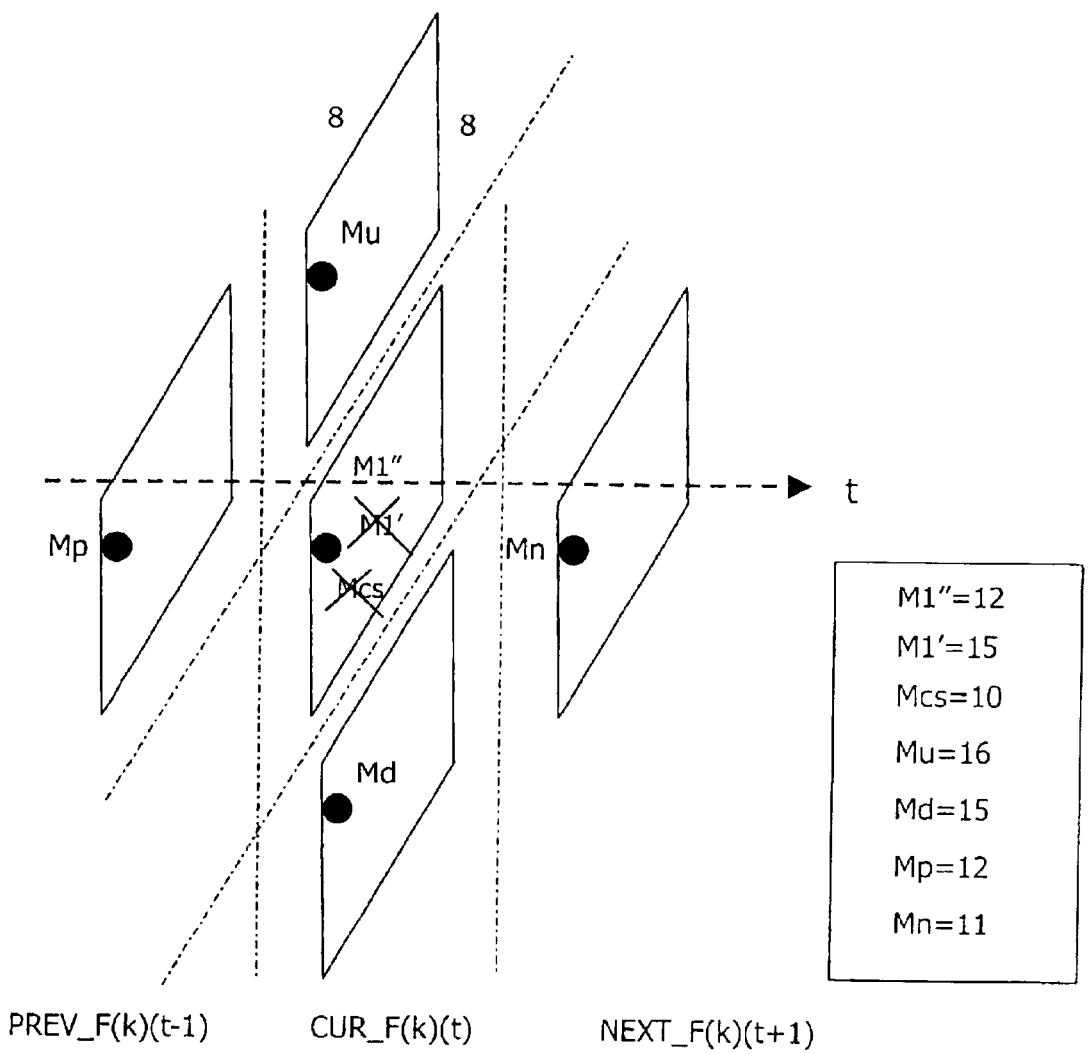
FIG. 6 illustrates a second embodiment of the method according to the invention of FIG. 2.

In a preferred second embodiment, the sub-step of spatial filtering is performed before the sub-step of temporal filtering, and the current temporal coefficient Mct of said temporal sub-step becomes the spatial median M1' calculated in said spatial sub-step. Thus, we have the following formula: M1"=median(median(Mcs,Mu,Md),Mp,Mn). As shown in FIG. 6, for example, we have Mcs=10, Mu=16, Md=15, and Mp=12 and Mn=11. Hence, the spatial median M1' is first calculated. M1'=median(10,16,15)=15. The current temporal coefficient Mct becomes the spatial median M1'. Then, the temporal median M1" is calculated. M1"=median(15,12,11)=12.

The second embodiment achieves better performances than the first embodiment in terms of temporal filtering and has a better temporal consistency within a sequence of images.

The spatial sub-step and the temporal sub-step are performed for each coefficient M within a transformed block from the left to the right and from the top to the bottom of the current field CUR_F(k)(t). In the case of an image with two fields, it is performed for the top field, and then for the bottom field, or vice versa.

Note that when all the coefficients M are equal from one image to another ("temporal" or "spatial" images), i.e. even if there is no discontinuity from one image to another, the medians are always calculated. Indeed, in this case, when a median is calculated, the coefficients M still remain unchanged. Consequently, as there are no changes, there is no need to do a previous test to look for discontinuities.

Note that, after a median computation, we can either do a test to see if the coefficients M remain unchanged and then, if it is the case, we do not make any replacement, or we can always make the replacement of a current coefficient.

Note that a coefficient M is either a DC coefficient or either an AC coefficient as mentioned before. The filtering of the DC coefficients, which represent the average luminance of an image, has the advantage that a change of the average luminance for 3 temporal images of, for example, the same scene is avoided, whereas the filtering of the AC coefficients has the advantage of filtering strong spikelike noise.

Note that the method according to the invention needs only one reading of the image as it uses, for each pixel, the spatial filtering sub-step immediately followed by the temporal filtering sub-step for the second preferred embodiment, and vice versa for the first embodiment. Therefore, said method according to the invention is faster than another method, which would consist of applying the spatial filtering sub-step to all the pixels of an image and then the temporal filtering sub-step to all these pixels, said method needing two readings of the image.

In a fourth step 4), an inverse discrete frequency transform on said filtered transformed block Bc is computed for providing an inverse transform block. The inverse discrete frequency transform referred to as IDCT allows returning to a "pixel" domain. Said IDCT transform is well known to those skilled in the art and will therefore not be explained here.

In a fifth step 5), pixels in said inverse transformed block, which have gone through the filtering step, are replaced by the detected motion pixels MVT_PIX, which were stored in the memory MEM. This latter step allows recovery of the motion areas in the corresponding image I(t). It avoids a temporal filtering of motion pixels. Indeed, there is no interest in performing temporal filtering on moving areas because it leads to a blurring effect.

Note that another solution to avoid filtering on moving areas is to perform the filtering step only on non-motion pixels NO_MVT_PIX instead of performing the filtering step on all the pixels of an image. However, this solution is much more complicated to perform.

Finally, the images of the video signal VS are post-processed especially in order to recover a video signal close to the video signal used before encoding. In the case of a television application, the corresponding sequence of images is displayed on a television screen.

In conclusion, thanks to the filtering step, the method according to the invention has the advantage of reducing fluctuation of luminance/chrominance in uniform areas as well as around edges and there is no need to differentiate between edge areas and non-edge areas in the image.

Moreover, it is especially efficient for low bit rates such as, for example, MPEG4 or MPEG2 video, but it may be used for any bit rate.

Note that the method according to the invention is based on the recognition that a complete discrete frequency transformed block of luminance/chrominance level is flickering and so the temporal filtering will reduce this flickering effect. Hence, there will be a temporal consistency of the sequence of images as mentioned before.

It is to be noted that the present invention is not limited to the aforementioned embodiments and variations and modifications may be made without departing from the spirit and scope of the invention as defined in the append claims.

It is to be noted that the present invention is not limited to the aforementioned television application. It may be used within a wide range of video applications such as videophone, video communication through a mobile or the Internet for any bit rate.

It is to be noted that there are numerous ways of implementing functions of the method according to the invention by means of items of hardware or software, or both, provided that a single item of hardware or software can carry out several functions. It does not exclude the fact that an assembly of items of hardware or software or both carry out a function. For example, the detection motion step can be combined with the filtering step, thus forming a single function without modifying the decoding method according to the invention.

Said hardware or software items can be implemented in several manners, for example, by means of wired electronic circuits or by means of a suitably programmed integrated circuit. The integrated circuit may be present in a computer or in a decoder. In the latter case, the decoder comprises motion detection means MVT_D adapted to perform the motion detection step 1), filtering means DCT_F adapted to perform the median filtering step 3), said means comprising spatial median sub-filtering means SPATIAL_F adapted to perform sub-step 3a), and temporal median sub-filtering means TEMP_F adapted to perform sub-step 3b) according to the first or second embodiment, discrete frequency and inverse discrete frequency transform means DCT_T, IDCT_T adapted to perform steps 2) and 4), respectively, and replacement means REPL_M adapted to perform step 5), as described previously, said means being hardware or software items as stated above.

The integrated circuit comprises a set of instructions. Thus, said set of instructions in, for example, a computer programming memory or in a decoder memory may cause the computer or the decoder to carry out the different steps of the digital video signal processing method.

The set of instructions may be loaded into the programming memory by reading a data carrier such as, for example, a disc. A service provider may also make the set of instructions available via a communication network such as, for example, the Internet.

The present invention also relates to a video data processing device that minimizes the memory bandwidth and the complexity of the implementation in order to perform the hereinbefore described processing method in real time and at low cost.

Figure 7:
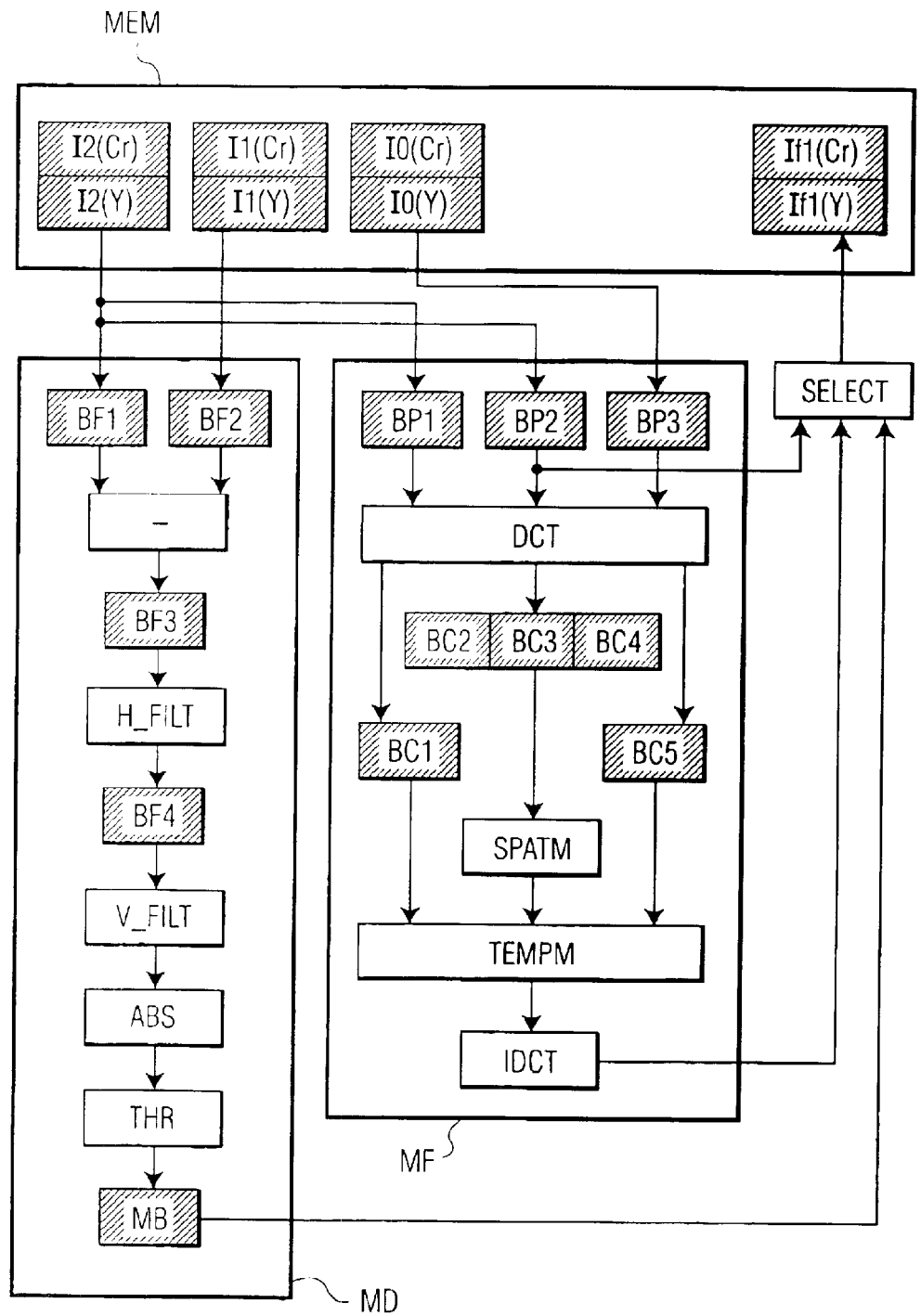
FIG. 7 is a schematic diagram of a processing device implementing the method according to the invention.

Such a video data processing device is depicted in FIG. 7. It comprises a motion detection module MD, which applies two filters, one for the luminance component Y and one for the chrominance component Cr, on an image difference from two consecutive fields I1 and I2, of the same parity. A system memory MEM contains three consecutive fields I0, I1 and I2. In order to reduce the transfers from the motion detection module MD to the system memory MEM and then to reduce the memory bandwidth, the motion detection module MD comprises embedded memories adapted to store intermediate data blocks. A first BF1 and second BF2 embedded memory are loaded with data blocks of I1 and I2. A subtraction module gives the difference between the contents of BF1 and BF2 embedded memories and stores the result in a third embedded memory BF3. In the preferred embodiment, the bi-dimensional filters are decomposed in two mono-dimensional filters. Each mono-dimensional filter is applied in the horizontal and vertical directions on, respectively, 5 and 3 luminance samples and on 4 and 3 chrominance components. In this way the number of operations involved in the filtering are decreased and accesses to the embedded memories are simplified. The result of the horizontal filter H_FILT, which is applied first, is stored in a fourth embedded memory BF4, on which the vertical filter V_FILT is applied. An absolute value ABS is then applied on the fly on each filtered pixel difference and afterwards, each pixel is compared with a threshold thanks to a threshold module THR. The result of the comparison determines if the pixel is a motion pixel and is stored in a fifth embedded memory MB.

The video data processing device also comprises a median filtering module MF, which applies a spatial and a temporal median filter in the DCT-transformed domain. First, a median filter is applied per pixel on three DCT-blocks of the current field. Next, a median filter is applied per pixel on a DCT-block of three consecutive fields. So, five DCT transformations are computed per block to be filtered. In order to minimize the memory bandwidth between the median filtering module MF and the system memory, five DCT transformations are computed in parallel by a DCT computing module from three embedded memories BP2, BP1 and BP3 adapted to store respectively a current block and 2 spatially adjacent blocks from a current field I1, a temporally adjacent block from a next field I2, and a temporally adjacent block from a past field I0. The intermediate results are stored in five other embedded memories BC1 to BC5. The median filter in the spatial domain SPATM is performed on the blocks stored in the BC2, BC3 and BC4 embedded memories, and the temporal median filter TEMPM is applied on the fly on the resulting filtered block and the contents of the BC1 and BC5 embedded memories. An IDCT transformation is applied on the filtered data to obtain the post-processed luminance. Replacement means SELECT allow pixels in the inverse transformed block to be replaced by the detected motion pixels, the final result being stored in the system memory.

Any reference sign placed between parentheses in the following claims should not be construed as limiting the claim. It will be obvious that the use of the verb "comprise" and its conjugations does not exclude the presence of any steps or elements other than those defined in any claim. The article "a" or "an" preceding an element or step does not exclude the presence of a plurality of such elements or steps.

What is claimed is:

1. A method of processing a digital video signal (VS), said video signal representing a sequence of images, characterized in that it comprises the steps of:
   detecting motion pixels in a current image (I(t)),
   computing a discrete frequency transform on blocks of said current image (I(t)) for providing transformed blocks,
   median filtering a current transformed block (Bc), said filtering comprising the sub-steps of:
   spatial median filtering a first set of coefficients (Mcs, Mu, Md) belonging to the current transformed block (Bc) and to neighboring blocks, and
   temporal median filtering a second set of coefficients (Mct, Mp, Mn) belonging to the current transformed block (Bc) and to corresponding blocks (Bp, Bn) of previous and subsequent images,
   computing an inverse discrete frequency transform on the filtered transformed block for providing an inverse transform block, and
   replacing pixels in said inverse transformed block by said detected motion pixels.

2. A method of processing a digital video signal as claimed in claim 1, characterized in that the spatial median filtering sub-step is performed before the temporal median filtering sub-step.

3. A method of processing a digital video signal as claimed in claim 1, characterized in that the detecting step comprises the sub steps of:
   filtering on pixel components of an image difference, and
   differentiating motion (MVT_PIX) and non-motion (NO_MVT_PIX) pixels by way of a threshold (TH).

4. A computer program product for a decoder, comprising a set of instructions, which, when loaded into said decoder, causes the decoder to carry out the method as claimed in claim 1.

5. A computer program product for a computer, comprising a set of instructions, which, when loaded into said computer, causes the computer to carry out the method as claimed in claim 1.

6. A decoder for processing a digital video signal (VS), said video signal representing a sequence of images, characterized in that it comprises:
   motion detection means adapted to detect motion pixels in a current image (I(t)),
   discrete frequency computation means adapted to compute a discrete frequency transform on blocks of said current image (I(t)) for providing transformed blocks,
   median filter means adapted to filter a transformed block (Bc), said filter comprising:
   a spatial median sub-filter adapted to filter a first set of coefficients (Mcs, Mu, Md) belonging to the current transformed block (Bc) and to neighboring blocks, and
   a temporal median sub-filter adapted to filter a second set of coefficients (Mct, Mp, Mn) belonging to the current transformed block (Bc) and to corresponding blocks (Bp, Bn) of previous and subsequent images, inverse frequency computation means adapted to compute an inverse frequency transform on the filtered transformed block and to provide an inverse transformed block, and replacement means adapted to replace pixels in said inverse transformed block by said detected motion pixels.

7. A decoder for processing a digital video signal (VS) as claimed in claim 6, characterized in that the spatial median filtering means are implemented before the temporal median filtering means.

8. A decoder for processing a digital video signal (VS) as claimed in claim 6, characterized in that the motion detection means comprise:

filtering means (LPF1, LPF2) adapted to filter pixel components of an image difference, and differentiating means adapted to differentiate motion (MVT_PIX) and non-motion (NO_MVT_PIX) pixels by way of a threshold (TH).

* * * * *